(12) United States Patent
Huang et al.

(10) Patent No.: US 10,048,785 B2
(45) Date of Patent: Aug. 14, 2018

(54) TOUCH DISPLAY DEVICE PROMOTING TOUCH ACCURACY

(71) Applicants: Shenzhen China Star Optoelectronics Technology Co., Ltd., Shenzhen, Guangdong (CN); Wuhan China Star Optoelectronics Technology Co., Ltd., Wuhan, Hubei (CN)

(72) Inventors: Yaoli Huang, Guangdong (CN); Jianxing Xie, Guangdong (CN); Chun-hung Huang, Guangdong (CN); Yucheng Tsai, Guangdong (CN); Chang Cao, Guangdong (CN)

(73) Assignees: Shenzhen China Star Optoelectronics Technology Co., Ltd, Shenzhen, Guangdong (CN); Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 51 days.

(21) Appl. No.: 14/916,564

(22) PCT Filed: Nov. 25, 2015

(86) PCT No.: PCT/CN2015/095581
§ 371 (c)(1),
(2) Date: Mar. 3, 2016

(87) PCT Pub. No.: WO2017/067041
PCT Pub. Date: Apr. 27, 2017

(65) Prior Publication Data
US 2017/0262104 A1    Sep. 14, 2017

(30) Foreign Application Priority Data
Oct. 20, 2015   (CN) .......................... 2015 1 0686201

(51) Int. Cl.
G06F 3/041    (2006.01)
G06F 3/044    (2006.01)

(52) U.S. Cl.
CPC ............ G06F 3/0412 (2013.01); G06F 3/044 (2013.01); G06F 3/0418 (2013.01)

(58) Field of Classification Search
CPC ....... G06F 3/0412; G06F 3/0418; G06F 3/044
See application file for complete search history.

(56) References Cited

U.S. PATENT DOCUMENTS 9,285,842 B2 * 3/2016 Yashiro ................... G06F 3/044
2006/0176266 A1 * 8/2006 Pak ...................... G02F 1/13338
345/104

(Continued)

FOREIGN PATENT DOCUMENTS

CN    103293785 A    9/2013
CN    104102402 A    10/2014

(Continued)

*Primary Examiner* — Sejoon Ahn
(74) *Attorney, Agent, or Firm* — Andrew C. Cheng

(57) ABSTRACT

The embodiment of the present invention discloses a touch display device, including: a common electrode layer, having a plurality of driving regions with driving region electrodes inside, which are arranged in a rectangular array, and a plurality of floating regions with floating region electrodes inside located between the driving regions of tow adjacent columns, and the two adjacent floating regions are located in space and construct a floating region pair, and isolating regions among the driving regions and the floating regions; floating connection lines are distributed at the sensing layer, and one point of a floating connection line is electrically coupled to the floating region electrode in one floating region in the floating region pair with a first via, and an another point of the floating connection line is electrically coupled to the floating region electrode in the other floating region in the floating region pair with a second via.

3 Claims, 3 Drawing Sheets

(56) References Cited

U.S. PATENT DOCUMENTS

| | | | |
|---|---|---|---|
| 2008/0309633 A1* | 12/2008 | Hotelling | G06F 3/0412 345/173 |
| 2009/0160783 A1* | 6/2009 | Yang | G06F 3/044 345/173 |
| 2009/0160787 A1* | 6/2009 | Westerman | G06F 3/0418 345/173 |
| 2009/0250268 A1* | 10/2009 | Staton | G06F 3/0412 178/18.06 |
| 2009/0295692 A1* | 12/2009 | Lee | G02F 1/13338 345/87 |
| 2010/0149128 A1* | 6/2010 | No | G02F 1/13338 345/174 |
| 2012/0097512 A1* | 4/2012 | Choi | G06F 3/044 200/5 A |
| 2012/0139876 A1* | 6/2012 | Jeon | G06F 3/0386 345/175 |
| 2012/0188201 A1* | 7/2012 | Binstead | G06F 3/041 345/174 |
| 2012/0274603 A1* | 11/2012 | Kim | G06F 3/0412 345/174 |

FOREIGN PATENT DOCUMENTS

| | | |
|---|---|---|
| CN | 104460139 A | 3/2015 |
| EP | 2391933 A1 | 12/2011 |

* cited by examiner

TOUCH DISPLAY DEVICE PROMOTING TOUCH ACCURACY

CROSS REFERENCE

This application claims the priority of Chinese Patent Application No. 201510686201.6, entitled "Touch display device", filed on Oct. 10, 2015, the disclosure of which is incorporated herein by reference in its entirety.

FIELD OF THE INVENTION

The present invention relates to a display technology field, and more particularly to a touch display device promoting touch accuracy.

BACKGROUND OF THE INVENTION

With the population of the smart electronic products, the capacitive touch panel has been widely applied in kinds of electronic products, such as smart phone, tablet and etc. The present capacitive touch panels can comprise the added on capacitive screen, such as G+G (Glass+Glass), GF (Glass Film), GFF (Glass Film Film), OGS (One Glass Solution), and the embedded capacitive screen, such as On cell, In cell. In the recent years, the people demands the user experience of feeling light and thin, which starts the competition of three technologies, OGS, On cell, In cell. The In cell has unique advantage in the manufacture process, which can make product lighter, thinner, more transparent to satisfy the requirement of the clients better. Thus, the In cell touch display device must become the mainstream of the touch display device.

As shown in FIG. 1, FIG. 1 is a plane diagram of a common electrode layer 100 of an In cell touch display device according to prior art. The common electrode layer 100 is divided into a plurality of driving regions 101 and a plurality of sensing regions 102. The respective driving regions 101 comprise the corresponding driving region electrodes inside. The respective sensing regions 102 comprise the corresponding sensing region electrodes inside. Specifically, the driving regions 101 are aligned in a rectangular array, and sensing regions 102 are located between the driving regions 101 of two adjacent columns. The driving region electrodes of the two adjacent driving regions 101 (in short of driving region pair) in the same row are electrically coupled with the driving lead line 103. With the existence of the sensing region 102, the bridge connection is required for arranging the driving lead line 103.

FIG. 2 shows an arrangement of driving lead lines 103 shown in FIG. 1. As shown in FIG. 2, the flat layer 200 and the gate isolation layer 300 are located in order under the common electrode layer 100. The flat layer 200 comprises data lines (due to the data lines, the metal connection line 302 cannot be arranged in the flat layer 200 to prevent the mutual interference of the metal connection line 302 and the data line) and a plurality of first vias 201. The gate isolation layer 300 comprises a plurality of second vias 301 and a plurality of metal connection lines 302. For each driving region, two first vias 201, two second vias 301 and one metal connection lien 302 correspond thereto. The driving region electrode of one driving region 101 sequentially penetrates the first via 201 and the second via 301 right below to be electrically coupled with one end of the metal connection line 302. The driving region electrode of the other driving region 101 sequentially penetrates the first via 201 and the second via 301 right below to be electrically coupled with the other end of the metal connection line 302. Significantly, the driving region electrodes filled in the first via 201 and the second via 301 and the metal connection line 302 construct the driving lead line 103 for coupling the aforesaid driving region pairs, together. Obviously, for arranging the driving lead line 103, two layers structure needs to be drilled in order. The flat layer 200 is thicker in general (such as 2 μm, which is twenty times of the thickness of the gate isolation layer 300). The process difficulty of drilling via is more increased. Therefore, the manufacture process of the In cell touch display device according to prior art is complicated, and the yield is low.

SUMMARY OF THE INVENTION

The embodiment of the present invention provides a touch display device promoting touch accuracy. The process difficulty of drilling hole can be effectively reduced to raise the production efficiency, and locating the isolation region between the driving region and the floating region can diminish the influence of the environment change to the touch accuracy.

The embodiment of the present invention provides a touch display device promoting touch accuracy, comprising a sensing layer, an isolation layer and a common electrode layer from top to bottom in sequence, wherein:

the common electrode layer comprises a plurality of driving regions having driving region electrodes inside and being arranged in a rectangular array, and a plurality of floating regions having floating region electrodes inside and being located between the driving regions of two adjacent columns, and the two adjacent floating regions are located in space to construct a floating region pair, and isolating regions among the driving regions and the floating regions;

floating connection lines are distributed at the sensing layer, and one point of a floating connection line is electrically coupled to the floating region electrode in one floating region in the floating region pair with a first via in the isolation layer, and an another point of the floating connection line is electrically coupled to the floating region electrode in the other floating region in the floating region pair with a second via in the isolation layer.

The common electrode layer further comprises a driving lead line penetrating the isolating regions between two adjacent floating regions, wherein:

the driving region electrodes in the two adjacent driving regions in the same row are electrically coupled with the driving lead line.

As the touch display device shows an image, the driving region electrode and the floating region electrode are both electrically coupled to a common voltage output end in a driving circuit; or as the touch display device implements touch scanning, the driving region electrode is electrically coupled to the common voltage output end in the driving circuit, and the floating region electrode is set null.

The sensing layer further comprises a plurality of first sensing regions corresponding to the floating regions one by one, and the first sensing region is located right above the floating region corresponded with the first sensing region, and the first sensing region comprises a sensing region electrode.

The sensing region electrode in the first sensing region is one of a metal mesh, a transparent Indium Tin Oxide electrode and a carbon nano-tube electrode.

The sensing layer further comprises a plurality of second sensing regions corresponding to the driving regions one by one, and the second sensing region is located right above the driving region corresponded with the second sensing region, and the second sensing region comprises a sensing region electrode, wherein:

the sensing region electrode in the second sensing region is electrically coupled to the driving region electrode in the driving region corresponded with the second sensing region with a third via in the isolation layer.

The sensing region electrode in the second sensing region is electrically coupled to the driving region electrode in the driving region corresponded with the second sensing region with the at least two third vias in the isolation layer.

The third vias are arranged in a rectangular array.

The sensing region electrode in the second sensing region is one of a metal mesh, a transparent Indium Tin Oxide electrode and a carbon nano-tube electrode.

By implementing the embodiment of the present invention, the common electrode layer comprises a plurality of driving regions with driving region electrodes inside, which are arranged in a rectangular array, and a plurality of floating regions with floating region electrodes inside located between the driving regions of two adjacent columns, and the two adjacent floating regions are located in space and construct a floating region pair, and isolating regions among the driving regions and the floating regions; and floating connection lines are distributed at the sensing layer, and one point of the floating connection line is electrically coupled to the floating region electrode in one floating region in the floating region pair with a first via in the isolation layer, and an another point of the floating connection line is electrically coupled to the floating region electrode in the other floating region in the floating region pair with a second via in the isolation layer. Accordingly, the process difficulty of drilling hole can be effectively reduced to raise the production efficiency, and locating the isolation region between the driving region and the floating region can diminish the influence of the environment change to the touch accuracy.

BRIEF DESCRIPTION OF THE DRAWINGS

In order to more clearly illustrate the embodiments of the present invention, the following figures will be described in the embodiments are briefly introduced. It is obvious that the drawings are only some embodiments of the present invention, those of ordinary skill in this field can obtain other figures according to these figures without paying the premise.

DETAILED DESCRIPTION OF PREFERRED EMBODIMENTS

Embodiments of the present invention are described in detail with the technical matters, structural features, achieved objects, and effects with reference to the accompanying drawings as follows. It is clear that the described embodiments are part of embodiments of the present invention, but not all embodiments. Based on the embodiments of the present invention, all other embodiments to those of ordinary skill in the premise of no creative efforts obtained, should be considered within the scope of protection of the present invention.

Figure 3:
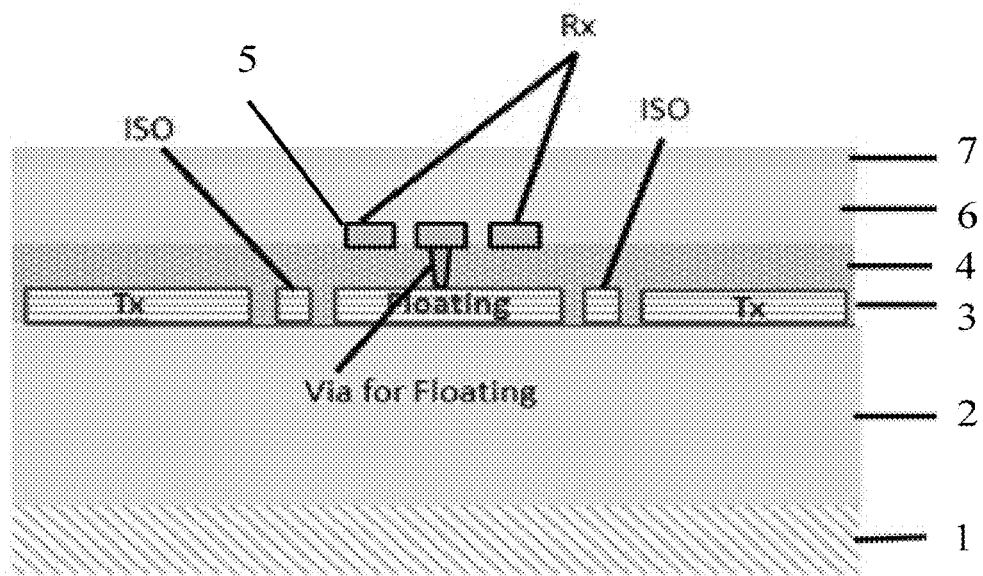
FIG. 3 is a structure diagram of a touch display device promoting touch accuracy provided by the embodiment of the present invention.

Please refer to FIG. 3. FIG. 3 is a structure diagram of a touch display device promoting touch accuracy provided by the embodiment of the present invention. The touch display device promoting touch accuracy can be a liquid crystal display, a digital photo display and a mobile terminal display. As shown in figure, the touch display device promoting touch accuracy in the embodiment of the present invention comprises:

as shown in FIG. 3, the touch display device promoting touch accuracy comprises a common electrode layer 3 and an isolation layer 4 formed on the common electrode layer 3 and a sensing layer 5 formed on the isolation layer 4. Besides, the touch display device promoting touch accuracy further comprises a thin film transistor array 1, a dielectric layer 2 formed on the thin film transistor array 1, a dielectric layer 6 formed on the sensing layer 5, and a pixel electrode layer 7 formed on the dielectric layer 6.

Figure 4:
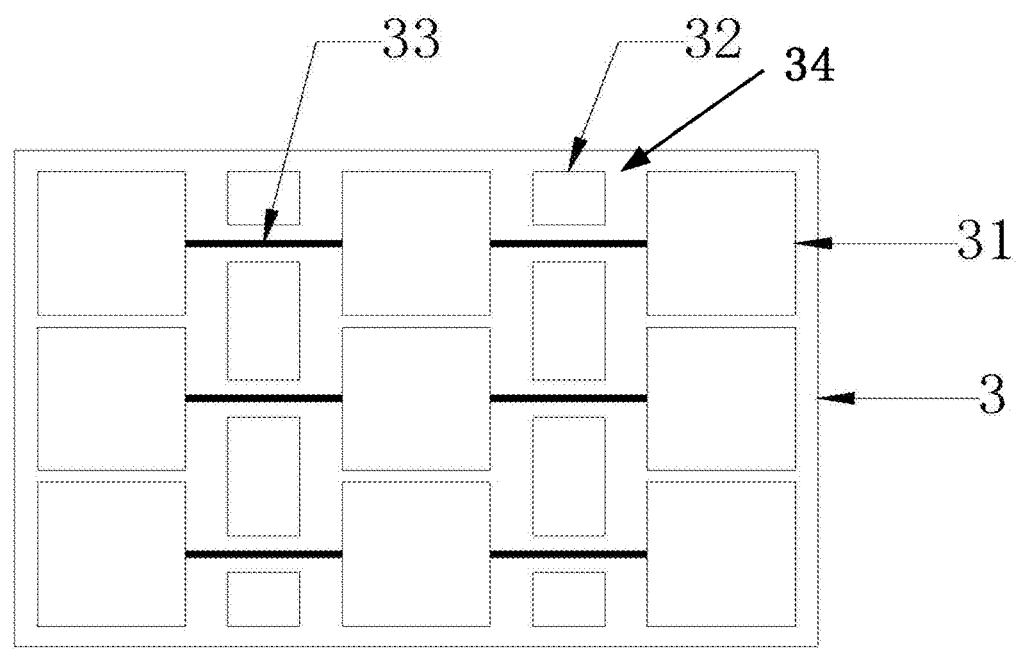
FIG. 4 is a plane diagram of one common electrode layer provided by the embodiment of the present invention.
Figure 5:
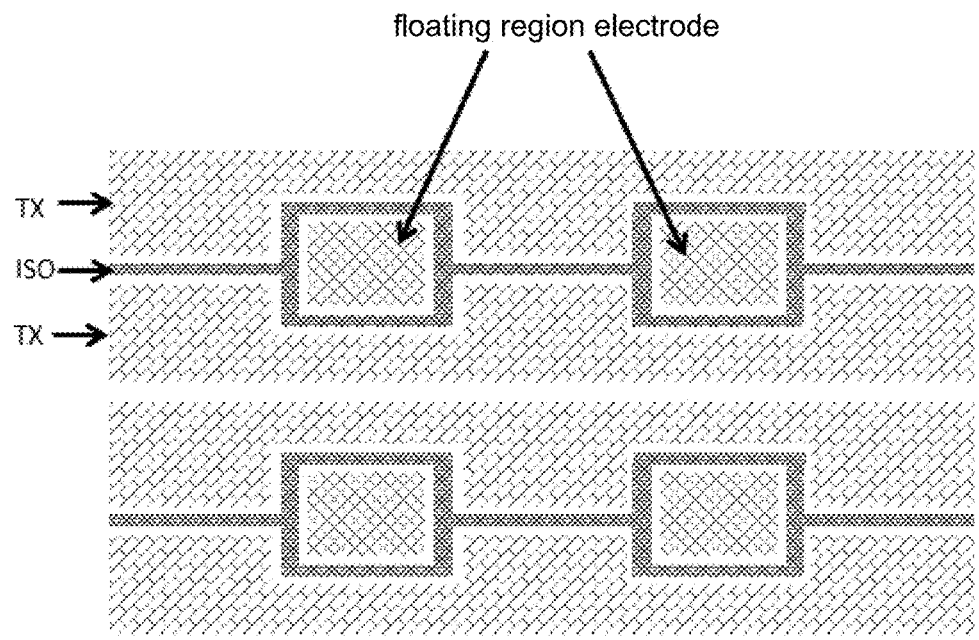
FIG. 5 is a plane diagram of another common electrode layer provided by the embodiment of the present invention.

Specifically, FIG. 4 shows a plane diagram of the common electrode layer 3 shown in FIG. 3. As shown in FIG. 4, the common electrode layer 3 comprises a plurality of driving regions 31, a plurality of floating regions 32, a plurality of driving lead lines 33 and isolation regions (ISO) 34 among the driving regions 31 and the floating regions 32. As shown in FIG. 5, FIG. 5 is a structure diagram of the driving regions 31, the floating regions 32 and the isolation regions 34 in the common electrode layer. In the showing stage, the isolation region 34 is electrically coupled to the common voltage output end in the driving circuit, and the isolation region 34 is grounded in the touch stage. For each floating region pair, a driving lead line 33 penetrates the isolating regions (i.e. the isolation region between the two floating regions 32 constructing the floating region pair) between in the floating region pair to electrically coupled the driving region electrodes in the two adjacent driving regions 31 of the same row. The driving electrodes in the two adjacent driving regions 31 of the same column are disconnected with each other. The driving electrodes are electrically coupled with the driving lead line 33 of the common electrode layer 3, and the floating region electrodes are electrically coupled with the floating connection line. Specifically, locating the isolation region 34 between the driving region 31 and the floating region 32 can diminish the influence of the environment change to the touch accuracy.

Figure 1:
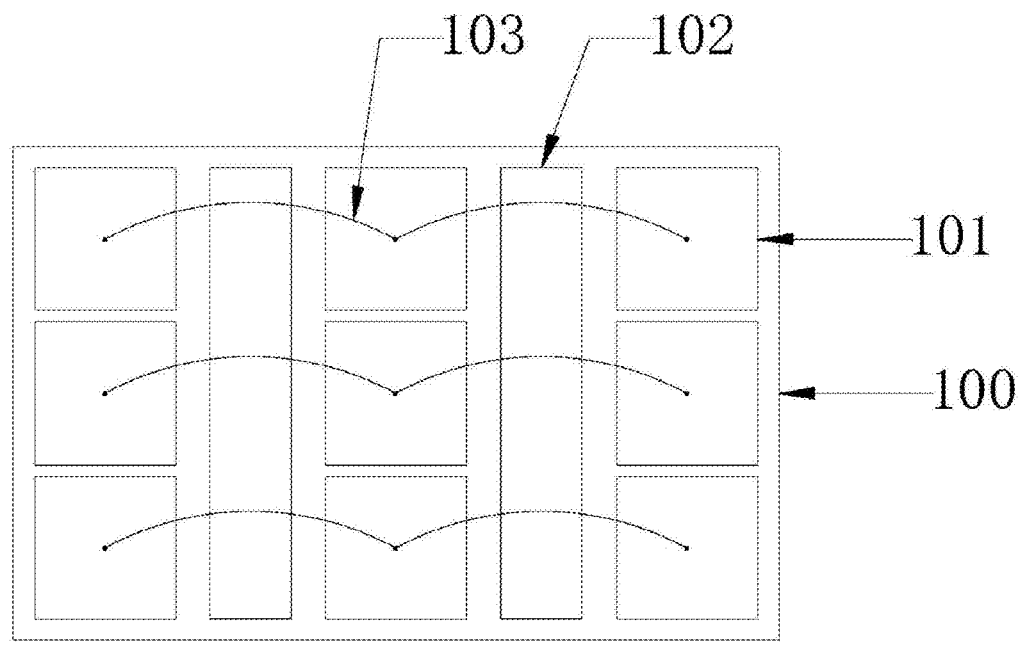
FIG. 1 is a plane diagram of a common electrode layer of an In cell touch display device according to prior art.
Figure 2:
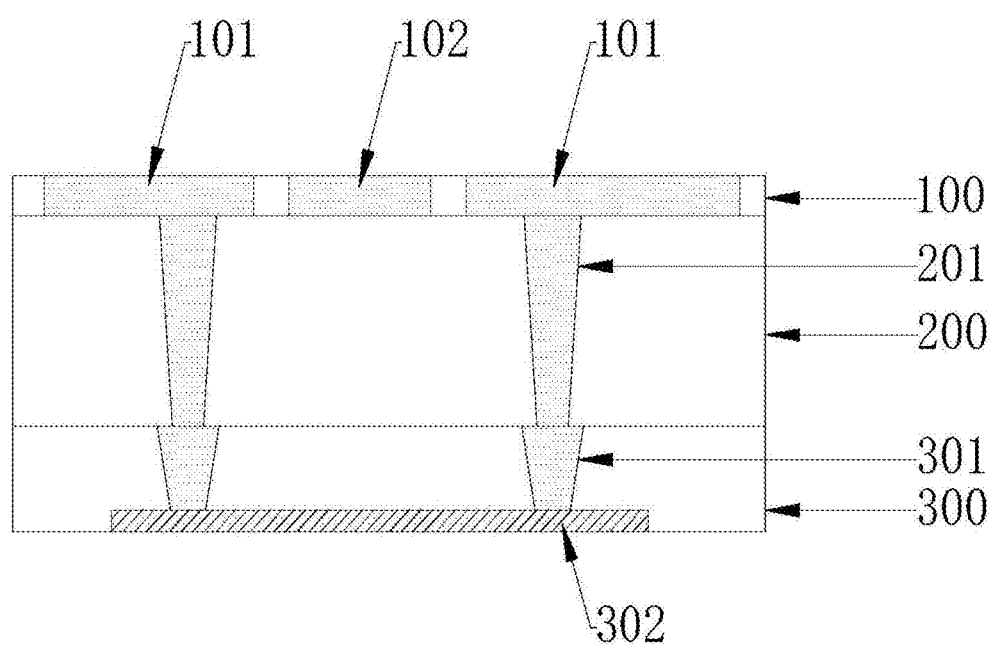
FIG. 2 is a arrangement of driving lead lines in the common electrode layer shown in FIG. 1.
Figure 6:
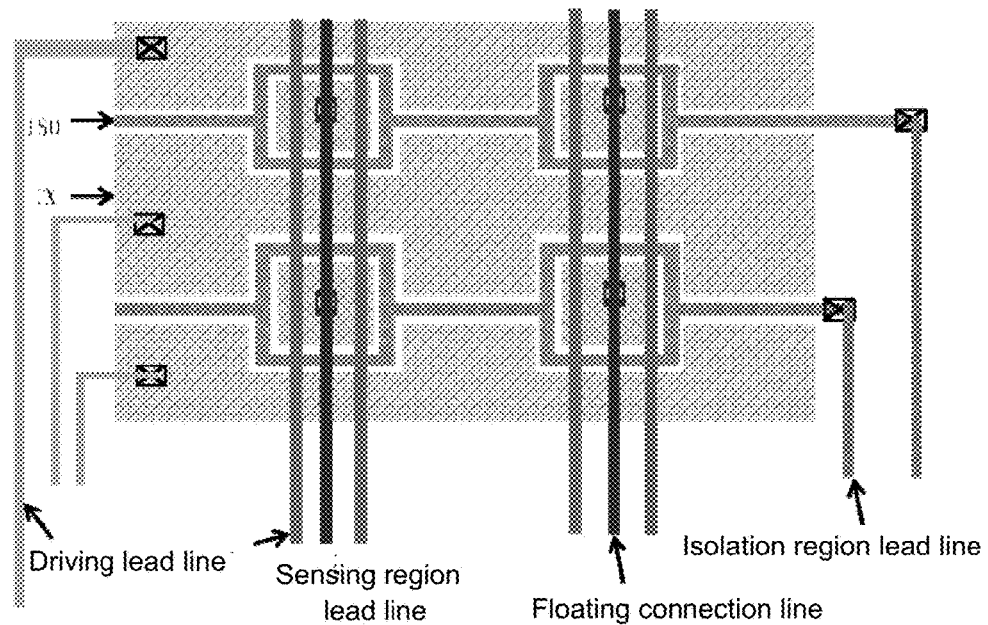
FIG. 6 is a plane diagram after a sensing layer and the common electrode layer provided by the embodiment of the present invention coincided.

Particularly, the driving regions 31 are arranged in a rectangular array, and each driving region 31 comprises a driving region electrode inside, and respective driving region electrodes are respectively controlled by the common voltage output end of the driving circuit (not shown in figure). A plurality of floating regions 32 are located between the driving regions 31 of two adjacent columns. Please refer to FIG. 2. Similar with the driving regions 31, the floating regions 32 are also arranged in a rectangular array, and each floating region 32 comprises a floating region electrode inside. Each floating region electrode is also controlled by the common voltage output end of the driving circuit as showing an image. In the embodiment of the present invention, every two adjacent floating regions 32 construct a floating region pair. As shown in FIG. 6, which is a plane diagram after the sensing layer 5 and the common electrode layer 3 coincided. The driving lead line and the isolation lead line are respectively conducted in a form of drilling hole at the edge of the isolation region 34 and the edge of the driving region 31. Because the route only crossing above the floating region 32 can cause the optical display issue, therefore, the crossing lead lines are required either above the driving region 31 and the floating region 32. The lead lines are respectively conducted with the driving region 31, floating region 32 below respectively corresponding thereto.

Please continue to refer to FIG. 3 and FIG. 6. The isolation layer 4 comprises a plurality of first vias (not shown in figure) and a plurality of second vias (not shown in figure). The amount of the first vias is equal to the amount of the floating region pairs, and the amount of the second vias is also equal to the amount of the floating region pairs. Each first via exclusively corresponds to one floating region pair, and each second via exclusively corresponds to one floating region pair. Each first via is provided with a floating connection crossing above, and one floating region in the corresponding floating region pair is located right below. Each second via is provided with a floating connection crossing above, and the other floating region in the corresponding floating region pair is located right below. Therefore, for each floating connection line, one point of a floating connection line is electrically coupled to the floating region electrode in one floating region 32 in the floating region pair with a first via in the isolation layer 4, and an another point of the floating connection line is electrically coupled to the floating region electrode in the other floating region in the floating region pair with a second via in the isolation layer 4. Particularly, the floating connection lines filled in the first vias and the second vias and the floating connection lines in the sensing layer 5 construct the floating lead lines for coupling the floating region pairs, together. By employing the aforesaid structure, the electrical connection of the floating region electrodes in two adjacent floating regions 32 can be realized.

In this embodiment, the driving region electrodes and the sensing region electrodes are respectively arranged in the common electrode layer 3 and the sensing layer 5, and only the isolation layer 4 is between the common electrode layer 3 and the sensing layer 5. The driving electrodes can be electrically coupled with the driving lead line 33 in the common electrode layer 3, and the floating region electrodes can be electrically coupled with the floating connection line arranged in the sensing layer 5 and the isolation layer 4. In the process of forming each floating lead line, only the isolation layer 4 has to be drilled for via, and the thickness of the isolation layer 4 is far less than the thickness of the flat layer. Thus, the process difficulty of drilling hole can be effectively reduced to overcome the defect of yield descend due to multilayer drilling hole, and to simplify the product structure for raising the yield. Next, the traditional TFT process can accomplish the manufacture procedure of the touch display device. No modification is required to the machine arrangement according to prior art. Besides, by utilizing the In cell technology, the touch and display are integrated on the display panel, and the production efficiency is raised.

Selectably, by controlling the display and the touch in time division, the perfect cooperation of the display function and the touch function of the touch display device can be achieved. Specifically, as showing an image, the driving region electrodes in the respective driving regions 31 and the floating region electrodes in the respective floating regions 32 are all electrically coupled to a common voltage output end in a driving circuit. As touch scanning, the driving region electrodes in the respective driving regions 31 remain to be electrically coupled to the common voltage output end in the driving circuit, and the floating region electrodes in the floating regions 32 are set null. In one preferred embodiment of the present invention, the following arrangement can be employed to set the floating region electrode to be null: an electronic switch is coupled to the floating region electrode and the common voltage output end of the driving circuit in series, and the electronic switch is controlled by one controller. The controller determines that the touch display device is in the image showing state and the touch scanning state at present: as it is in the image showing state, the controller controls the electronic switch to be off so that the floating region electrode is electrically coupled to the common voltage output end of the driving circuit; as it is in the touch scanning state, the controller controls the electronic switch to be on so that the connection of the floating region electrode and the common voltage output end of the driving circuit is off, and the floating region electrode is set null.

Selectively, the sensing layer 5 further comprises a plurality of first sensing regions corresponding to the floating regions 32 one by one, and the first sensing region is located right above the floating region corresponded with the first sensing region, and the first sensing region comprises a sensing region electrode inside. As touch scanning, the driving region electrodes in the respective driving regions 31 remain to be electrically coupled to the common voltage output end in the driving circuit, and the floating region electrodes in the floating regions 32 are set null. The floating region electrode is electrically coupled with the sensing region electrode corresponding thereto. Thus, the signal sensing volume can be enlarged to increase the signal to noise ratio. Particularly, the sensing region electrode in the first sensing region is preferably to be one of a metal mesh, a transparent Indium Tin Oxide electrode and a carbon nano-tube electrode. When the sensing region electrode in the first sensing region is the metal mesh, the conductive resistance can be lower, and the sensing layer can be thinner, which are beneficial for promoting the strength and the cost-price value of the touch display device.

Furthermore, the sensing layer 5 further comprises second sensing regions on the basis of the aforesaid embodiment. The amount of the second sensing regions is equal to that of the driving regions 31, and each second sensing region exclusively corresponds to one driving region 31, and the second sensing region is located right above the driving region 31 corresponded therewith. Besides, the second sensing region comprises a sensing region electrode inside. Correspondingly, the isolation layer 4 further comprises a third via (not shown in figures) employed to coupled the sensing region electrode and the corresponding driving region electrode. The sensing region electrode in the second sensing region is electrically coupled to the driving region electrode in the driving region 31 corresponded therewith with the third via in the isolation layer 4. Particularly, similar with the sensing region electrode in the first sensing region, the sensing region electrode in the second sensing region is preferably to be one of a metal mesh, a transparent Indium Tin Oxide electrode and a carbon nano-tube electrode. When the sensing region electrode in the second sensing region is the metal mesh, the conductive resistance can be lower, and the sensing layer can be thinner, which are beneficial for promoting the strength and the cost-price value of the touch display device.

In this embodiment, the existence of the sensing region electrode in the second sensing region can improve the balance of the display pixel. The reason can be below: in prior art, generally, the driving region electrode is a transparent Indium Tin Oxide electrode, of which the resistance is larger. In the process of forming the driving region electrode, the difference of the resistances of the driving region electrodes in the respective driving regions 31 is larger, and then, it results in the unbalance of the display pixel. As utilizing the present, with the arrangement of the sensing region electrode in the second sensing region, which is equivalent to one resistance is coupled in parallel to two ends of each driving region electrode. Therefore, the total resistance after the driving region electrode and the sensing region electrode decreases, and thus the difference of the resistance (the total resistance after coupling in parallel) of the driving region electrode in the driving region 31 decreases. Therefore it is helpful to improve the balance of display pixel. Besides, as the sensing region electrode in the second sensing region is preferably to be metal mesh, because the resistance of the metal mesh is smaller, the issue of the yield descend due to the total resistance over reduction can be prevented.

Furthermore, the third via employed for coupling the sensing region electrode and the driving region electrode can be a via, or can be a set of a plurality of vias. In one preferred embodiment of the present invention, the sensing region electrode in the second sensing region is electrically coupled to the driving region electrode in the driving region 31 corresponded therewith with the at least two third vias in the isolation layer 4.

In the embodiment of the present invention, the common electrode layer comprises a plurality of driving regions with driving region electrodes inside, which are arranged in a rectangular array, and a plurality of floating regions with floating region electrodes inside located between the driving regions of two adjacent columns, and the two adjacent floating regions are located in space and construct a floating region pair, and isolating regions among the driving regions and the floating regions; and floating connection lines are located at the sensing layer, and one point of each floating connection line is electrically coupled to the floating region electrode in one floating region in the floating region pair with a first via in the isolation layer, and an another point of the floating connection line is electrically coupled to the floating region electrode in the other floating region in the floating region pair with a second via in the isolation layer. Accordingly, the process difficulty of drilling hole can be effectively reduced to raise the production efficiency, and locating the isolation region between the driving region and the floating region can diminish the influence of the environment change to the touch accuracy.

It should be noted that, for each of the aforementioned embodiments of the method, for simplifying description, it is expressed as a combination of a series of actions. Nevertheless, the skilled person should understand that the present invention is not limited to the described operation sequence because some steps can be employed in other order sequentially or simultaneously according to the present invention. Secondly, those skilled persons in this art should understand that the embodiments described in the specification are all the preferred embodiments, and the involved operations and modules of the present invention should not be not essential.

In the foregoing embodiments, the description of the various embodiments have respective different emphases, and a part in some embodiment, which is not described in detail can be referred to the related description of other embodiments.

Those persons of ordinary skill in this field will be appreciated that the whole or the part of the steps in the above-described embodiments of the various methods can be accomplished by a program instructing the relevant hardwares. The program may be stored in a computer-readable storage medium, and the storage medium may include: flash disk, Read-Only Memory (ROM), Random Access Memory (RAM), magnetic disk or optical disk.

The detail description has been introduced above for the content download method provided and related equipment, the system provided by the embodiment of the invention. Herein, a specific case is applied in this article for explain the principles and specific embodiments of the present invention have been set forth. The description of the aforesaid embodiments is only used to help understand the method of the present invention and the core idea thereof; meanwhile, for those of ordinary skill in the art, according to the idea of the present invention, there should be changes either in the specific embodiments and applications but in sum, the contents of the specification should not be limitation to the present invention.

What is claimed is:

1. A touch display device promoting touch accuracy, comprising:
    a sensing layer, an isolation layer and a common electrode layer from top to bottom in sequence, wherein the common electrode layer comprises a plurality of driving regions having with driving region electrodes inside and is arranged in a rectangular array, and a plurality of floating regions having floating region electrodes inside and is located between the driving regions of two adjacent columns, and the two adjacent floating regions are located in space to construct a floating region pair, and isolating regions among the driving regions and the floating regions; floating connection lines are distributed at the sensing layer, and one point of a floating connection line is electrically coupled to the floating region electrode in one floating region in the floating region pair with a first via in the isolation layer, and another point of the floating connection line is electrically coupled to the floating region electrode in other floating region in the floating region pair with a second via in the isolation layer,
    wherein the common electrode layer further comprises a driving lead line penetrating the isolating regions between two adjacent floating regions, wherein: the driving region electrodes in the two adjacent driving regions in the same row are electrically coupled with the driving lead line,
    wherein the driving region electrode and the floating region electrode are both electrically coupled to a common voltage output end in a driving circuit as the touch display device shows an image; or the driving region electrode is electrically coupled to the common voltage output end in the driving circuit, and the floating region electrode is set null as the touch display device implements touch scanning,
    wherein the sensing layer further comprises a plurality of first sensing regions corresponding to the floating regions one by one, and the first sensing region is located right above the floating region corresponded with the first sensing region, and the first sensing region comprises a sensing region electrode,
    wherein the sensing region electrode in the first sensing region is one of a metal mesh, a transparent Indium Tin Oxide (ITO) electrode and a carbon nano-tube electrode, and wherein the sensing layer further comprises a plurality of second sensing regions corresponding to the driving regions one by one, and the second sensing region is located right above the driving region corresponded with the second sensing region, and the second sensing region comprises a sensing region electrode, wherein:

the sensing region electrode in the second sensing region is electrically coupled to the driving region electrode in the driving region corresponded with the second sensing region.

2. The touch display device promoting touch accuracy according to claim 1, wherein the sensing region electrode in the second sensing region is electrically coupled to the driving region electrode in the driving region corresponded with the second sensing region.

3. The touch display device promoting touch accuracy according to claim 1, wherein the sensing region electrode in the second sensing region is one of a metal mesh, a transparent Indium Tin Oxide (ITO) electrode and a carbon nano-tube electrode.

* * * * *